Aug. 18, 1959     H. B. SEGER     2,900,008
TRAINING DEVICE FOR SKATERS
Filed Dec. 23, 1957
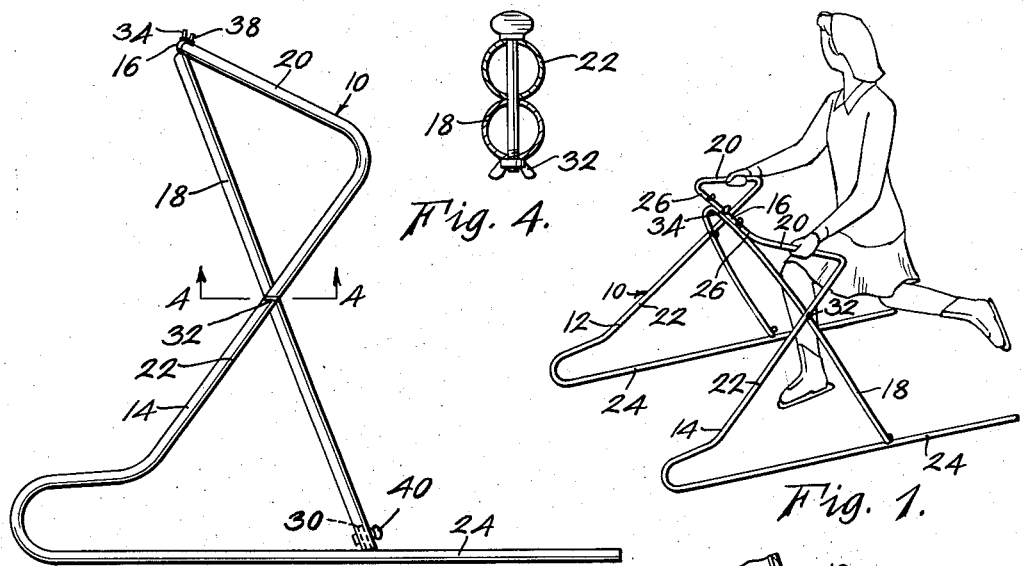
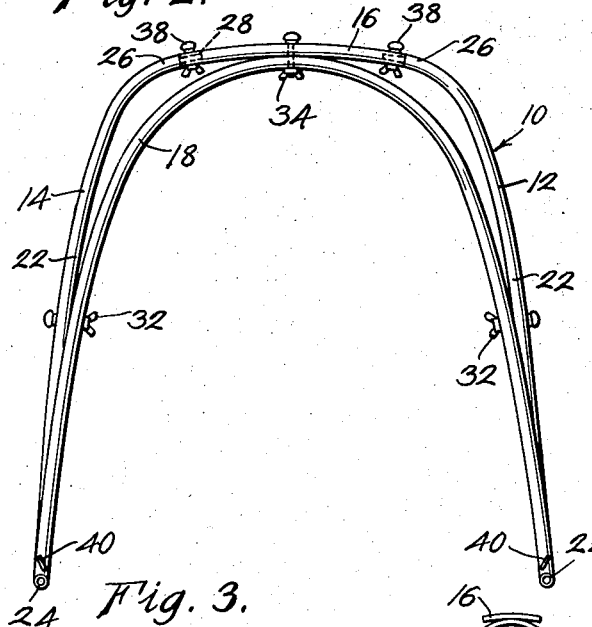
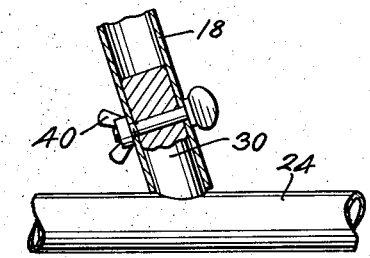
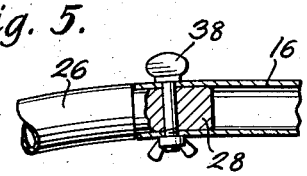
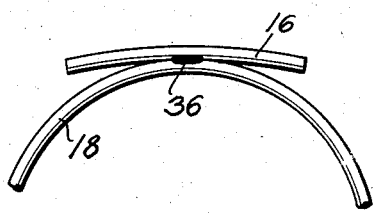
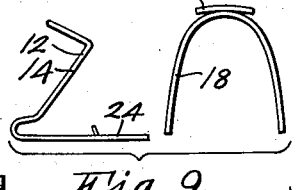
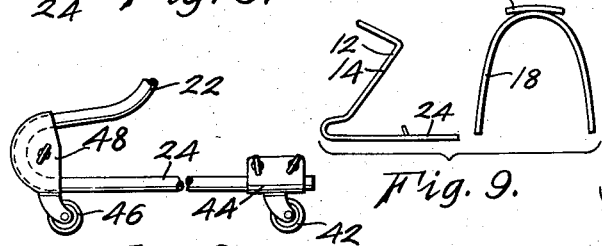
INVENTOR.
HAROLD B. SEGER
BY
ATTORNEY United States Patent Office 2,900,008
Patented Aug. 18, 1959

2,900,008

TRAINING DEVICE FOR SKATERS

Harold B. Seger, Wheat Ridge, Colo.

Application December 23, 1957, Serial No. 704,417

3 Claims. (Cl. 155—22)

This invention relates to training aids and, more particularly, to a device for use in training skaters to skate on either roller or ice skates.

Many persons, both young and old, experience considerable difficulty in learning to ice skate or roller skate. A great deal of speed can be attained on both types of skates and, for this reason, falls can be unusually severe. Once a person has taken a bad fall, they oftentimes become afraid and may abandon further efforts to learn to skate or, at least, they become so cautious that the learning process becomes a lengthy one.

Older persons, in particular, find it extremely difficult to learn to skate as they know a single fall may result in one or more broken bones or other serious injury. Also, their physical aptitude and coordination are seldom that of a younger person or a child who can act quickly enough, in most instances, to avert serious injury if they fall.

In general, persons learning to skate feel a good deal more secure if they are able to hold on to someone, particularly a more experienced skater, to prevent falling. However, in many instances a good skater is not available or they do not have the time and patience required to teach a beginner.

Roller skating raises certain additional problems not usually associated with ice skating. First of all, roller skating is quite often done on concrete sidewalks or similar areas where almost any fall will result in a skinned knee or elbow and torn clothing. Also, most persons find it more difficult to turn sharply or stop on roller skates than on ice skates.

It is, therefore, the principal object of the present invention to provide a training device for skaters which affords them the much needed security against a serious fall.

A second object is to provide a training aid that is adaptable with minor change for use in both roller and ice skating.

Another object is the provision of a skater's training device that is extremely lightweight and which may be rapidly disassembled for shipment, storage and movement from place to place.

Still another object is to provide a supporting frame for skaters that is designed for free movement in any direction and will, therefore, not interfere with the execution of even complex figures.

An additional object of the invention is the provision of a training device that is simple to use and cannot, in itself, cause injury to the user.

Further objects of the invention are to provide a device for use by beginning skaters that is relatively compact, simple, inexpensive, versatile and rugged.

Other objects will be in part apparent and in part pointed out specifically hereinafter in connection with the description of the drawing that follows, in which:

Figure 1 is a perspective view showing the skater's training aid of the present invention being used by an ice skater;

Figure 2 is a side elevation of the training aid;

Figure 3 is a rear elevation thereof;

Figure 4 is a section taken along line 4—4 of Figure 2 to an enlarged scale;

Figure 5 is an enlarged fragmentary view partly in section showing the manner in which the side frame elements are detachably connected to the bow.

Figure 6 is an enlarged fragmentary view, portions of which are shown in section, showing the connection between the side frame elements and the center section of the frame;

Figure 7 is a fragmentary view showing a slight modification in which the center section of the frame is permanently welded to the bow.

Figure 8 is a fragmentary view showing the manner in which casters may be detachably connected to the frame; and, Figure 9 is an exploded view to a reduced scale showing the components of the frame.

Referring now to the drawing, and in particular to Figures 1, 2 and 3 thereof, the training device of the present invention will be seen to comprise a frame, indicated in a general way by numeral 10, preferably formed of two or more detachable sections. In the particular embodiment illustrated in Figures 1 through 3, the frame includes four sections; namely, right and left side frame members 12 and 14, center section 16, and bow 18. All of the frame elements are preferably formed from metal tubing as shown.

Side frame elements 12 and 14 are generally Z-shaped having an upper portion 20 which has been shown with a slight downward inclination from front to rear, an intermediate portion 22 extending downwardly and forwardly from the rear end of the upper portion, and a lower portion 24 extending rearwardly along the ground from the lower end of the intermediate portion to form a skid or runner when the device is used on the ice or snow. The upper and forward end of the upper portion 20 is inturned as at 26 and provided with a projecting plug 28 which connects with the center section 16. Portion 24 of the side frame members 12 and 14 is substantially straight and includes a pin 30 projecting upwardly therefrom at a point intermediate its ends to receive the bow 18.

Center section 16 of the frame is merely a short section of the tubing, preferably curved slightly, to which the side frame elements and the bow are detachably connected. The bow 18 is of an inverted U-shape and is connected at the top to the center section and to the runners 24 of the side frame elements at its lower ends as well as the points at which it crosses the intermediate sections.

In Figures 2, 3 and 4 it can be seen that the bow is detachably connected to the intermediate sections of the side frame members by wing nuts 32. Similarly, the midpoint of the bow 20 is connected to the corresponding point of the center section 16 by a wing nut 34. In Figure 7, a slightly modified form of the invention has been illustrated in which the center section 16 and bow 18 of the frame are permanently attached to one another by weld 36.

Figures 2, 3, 5 and 6 disclose the manner in which the side frame elements 12 and 14 are detachably connected to the center section 16 and bow 18. Plugs 28 on the inturned ends 26 of the side frame elements fit into the opposite open ends of the center section where they are retained or fastened by wing nuts 38. In like manner, the pins 30 carried by the runners 24 of the side frame elements are fastened within the open lower ends of the bow by wing nuts 40.

Now, in connection with Figures 1 and 9, it will be noted that the runners 24 are widely spaced from one another in substantially parallel relation to provide a great deal of freedom for the movements of the skater's feet therebetween. Also, the frame at ground level is completely unobstructed in both front and back. The runners 24 are completely free to turn and slide in any direction, including sideways as well as straight ahead. Bow 18 provides a brace that strengthens the frame so that it may be constructed of lightweight tubular stock. The upper portions 20 of the side frame elements are spaced and inclined to provide a convenient handhold for the skater. In addition, the upper portions 20 are located such that they lie approximately midway between the front and rear ends of the frame so that the weight of the user will not tend to tilt the device.

In Figure 8 it can be seen that the frame 10 in Figures 1 through 7 and 9 can easily be converted for use with roller skates to operate on the ground rather than ice by the addition of casters. In the particular embodiment shown two casters 42 pivotally mounted on the brackets 44 are detachably mounted on the rear ends of the runners 24; whereas, like casters 46 are pivotally attached to other suitable brackets 48 which are, in turn, mounted on the front ends of the runners 24.

Having thus described the several useful and novel features of the training aid for skaters of the present invention, it will be seen that the many useful objects for which it was designed have been achieved. Although the present invention has been described in connection with the few specific forms thereof that have been illustrated in the accompany drawing, I realize that certain changes and modifications therein may occur to those skilled in the art within the broad teaching hereof; hence, it is my intention that the scope of protection afforded hereby shall be limited only insofar as said limitations are expressly set forth in the appended claims.

What is claimed is:

1. A training device for skaters and the like comprising a frame including two generally Z-shaped side frame elements, a center section and an inverted generally U-shaped bow, the side frame elements and upper portion, a lower runner-forming portion and an intermediate portion interconnecting the rear end of the upper portion with the front end of the lower portion, the center section interconnecting the upper portions of the side frame elements to maintain the same in transversely spaced relation, and the bow interconnecting the center frame section and the intermediate and lower portions of the side frame elements.

2. The training device as set forth in claim 1 in which casters are pivotally attached to the front and rear ends of each lower portion of the side frame elements.

3. A training device for skaters and the like comprising two generally Z-shaped side frame elements in which the lower portions form ground-engaging runners and the upper portions thereof are interconnected to maintain said runners in spaced substantially parallel relation, and an inverted generally U-shaped bow connected to extend from the connection between the side frame elements to the runners wherein the upper portions of the side frame elements are provided with inturned ends, a center frame section detachably interconnects the inturned ends of the side frame elements, and the bow interconnects the center frame section and the runners.

References Cited in the file of this patent
UNITED STATES PATENTS

| | | |
|---|---|---|
| 1,700,997 | Carlson | Feb. 5, 1929 |
| 2,098,722 | Depovsek | Nov. 9, 1937 |
| 2,294,704 | Ware | Sept. 1, 1942 |
| 2,347,754 | Shay | May 2, 1944 |
| 2,627,904 | Thiemann | Feb. 10, 1953 |
| 2,734,554 | Ries | Feb. 14, 1956 |